2,947,711

EPOXIDE COMPOSITIONS CONTAINING MALEIC ANHYDRIDE-UNSATURATED ORGANIC ACID ADDUCTS AND METHOD OF FORMING INFUSIBLE PRODUCTS THEREFROM

Harold G. Cooke, Jr., and John E. Masters, Louisville, Ky., assignors to Devoe & Raynolds Company, Inc., Louisville, Ky., a corporation of New York No Drawing. Filed Aug. 1, 1955, Ser. No. 525,823

4 Claims. (Cl. 260—18)

This invention relates to epoxide compositions and their reaction to form new reaction products, and to the resulting products.

This invention relates to new epoxide compositions in which an epoxide resin or polyepoxide is reacted with a converter for the epoxides, which converter is an adduct of maleic anhydride and rosin acid, and which contains both a carboxyl group and an anhydride group, and the production of products of such reaction, which are useful as adhesives, for molding and castings, and in making pigmented and unpigmented coatings for wood, glass, metal, etc.

The converters which are used with the epoxide resins, according to the present invention, are adducts of maleic anhydride with unsaturated monocarboxylic acids of the rosin type. These adducts are prepared, for example, by heating approximately equimolecular proportions of the reactants at a temperature of 400° F. to 500° F. for a period of from ½ to 2 hours. The adducts contain, in addition to a carboxyl group, a dibasic anhydride functional group. These adducts are further trifunctional in nature and are advantageous cross-linking agents for use as converters for epoxide resins. In preparing these adducts, the reaction is one in which 1 mol of the acid and 1 mol of maleic anhydride react, but an excess of one or the other of the reactants can be used to give a somewhat modified product.

The rosin acids used in making the adducts include acids such as abietic acid and other rosin acids.

Fumaric acid may be used in place of maleic anhydride in making the adducts, since it appears to revert to the anhydride and exist in the adduct in that form.

The epoxide resins or polyepoxides which are used in making the new compositions are epoxides which, in general, contain more than 1 epoxide group per molecule.

Epoxide resins such as are produced by the reaction of dihydric phenols with epichlorhydrin or glycerol dichlorhydrin in the presence of caustic alkali are advantageously used with the adducts as converters in compositions and in making the products of the present invention. These epoxide resins include liquid or low melting point epoxide resins which are diglycide ethers of dihydric phenols or products containing such diglycide ethers as their principal constituents. They also include epoxide resins of higher melting points and more or less polymeric in character, such as are described, for example, in U.S. Patents 2,582,985 and 2,615,007, and higher melting point epoxide resins such as described in U.S. Patent 2,615,008.

Epoxide resins which can advantageously be used in making the new compositions also include resins made from polyhydric phenols and aliphatic polyepoxides, as described, for example, in U.S. Patent 2,592,560.

Another type of epoxide resins or polyepoxides which are advantageously used with the adducts in making the new compositions are aliphatic polyepoxides such as diglycide ether or aliphatic polyepoxides made from glycerin, as described, for example, in U.S. Patent 2,581,464.

Another type of polyepoxides which can advantageously be used in making the new compositions are the epoxidized esters of unsaturated fatty acids, as described, for example, in U.S. Patent 2,485,160.

It is one advantage of the present invention that the adducts used are of relatively high molecular weight and can be used in relatively large proportions as converters for the epoxide resins. The adducts have the advantage that they are low cost products, particularly so in comparison with the epoxide resins, and with converters heretofore used.

The adducts of maleic anhydride and rosin acids have the unique property and the advantage that they contain a free acid group which is readily reactive with an epoxide group of the epoxide resin by a direct addition reaction. In addition, the adducts have the unique property that they contain an anhydride group which is not directly reactive with epoxide groups of the resin but are reactive with alcoholic hydroxyl groups of the resin or of the initial reaction products of the resin with the adducts. Epoxide resins which initially contain aliphatic hydroxyl groups can react directly with the anhydride, by direct addition, and with the setting free of a carboxyl group which, when formed, can react with epoxide groups. If the polyepoxides initially used do not contain aliphatic hydroxyl groups, the initial reaction of a free carboxyl group of the adduct with an epoxide group of the resin, by direct addition, results in the formation of a hydroxyl group which can then react with the anhydride group of the adduct.

In considering the available or potentially available acid groups of the adducts, only two come into consideration; one, the free carboxyl group of the adduct, and the other, the carboxyl group set free when an alcoholic hydroxyl group reacts with the anhydride group of the adduct.

In determining the amount of reactive acid groups, available for reaction with epoxide groups, the usual method of titration was used to determine the figures referred to in the following examples.

The value thus determined and as referred to in the examples is about ⅔ more or less of the theoretical value. This value appears to be the actual available reactive carboxyl groups for use as converting agents in this reaction, i.e., for reaction with the epoxide groups of the epoxide resins used. But along with the reaction of carboxyl groups with epoxide groups of the resin, there is a further reaction of the anhydride group of the adduct with hydroxyl groups present in or formed by the reaction, thus giving a further cross-linking bond between the adducts and the epoxide resins, and this reaction setting free a carboxyl group capable of reacting with epoxide groups of the resin.

The use of the adducts as converting or cross-linking agents is particularly advantageous because they are trifunctional and serve to cross-link different resin or polyepoxide molecules. This cross-linking is accomplished by the reaction of the carboxyl groups of the adduct, which react with epoxide groups; by the anhydride groups of the adduct, which react with alcoholic hydroxyl groups initially present or formed by the reaction of carboxyl and epoxide groups; and by the added carboxyl groups, which are set free when the anhydride group thus reacts and which can further react with epoxide groups of the resin.

The proportions of adduct and of epoxide resin or polyepoxide can be somewhat varied. Advantageous proportions are proportions such that there is one titratable carboxyl for each epoxide group of the polyepoxide resin, but the invention is not limited for equivalent ratios. Useful products have been obtained using an excess of epoxide as well as an excess of carboxyl, e.g., ratios of from 0.2 to 2.0 epoxide equivalents of the resin for each carboxyl equivalent of the adduct, or more advantageously from 0.5 to 1.5 epoxide equivalents to 1 carboxyl equivalent.

Mixtures of polyepoxides or epoxide resins can be used with the adducts, and mixtures of adducts can be used with the epoxide resins.

In general, the maleic adduct-epoxide compositions will cure without the use of a catalyst, but for the higher melting polyepoxides and epoxide resins it is advantageous to employ a catalyst for promoting the reaction. Particularly useful catalysts are catalysts such as triethanolamine, dimethylaminomethyl phenol (DMP–10, Rohm & Haas) and quaternary ammonium bases such as benzyl trimethyl ammonium hydroxide.

The invention will be further illustrated by the following specific examples, the parts being by weight:

Of the following examples, Example 1 illustrates the preparation of the adducts. Examples 2–8 illustrate different epoxide resins and polyepoxides. And the other examples illustrate the use of the epoxide resins and adducts according to the present invention.

In the first example, the procedure for determining the acid values is that above given, and indicates the actual available carboxyl rather than the total acid of the product.

*Example 1.*—Approximately equimolecular quantities of rosin (350 parts) and maleic anhydride (98 parts) were heated to 525° F. for 30 minutes to give a hard, brittle product having an acid value of 333 and a titrated weight per carboxyl group of 168. A 50% solution of the adduct in xylene had a viscosity of B and a color of 14.

Examples 2–7 illustrate different epoxide resins, and Example 8, an epoxidized oil. The epoxide resin of Example 2 is a liquid aliphatic polyepoxide such as described in U.S. Patent 2,581,464. Examples 3, 4, 5 and 6 are epoxide resins produced from bisphenol and epichlorhydrin in the presence of caustic alkali, Example 3 illustrating a liquid resin made up mainly of the diglycide ether of bisphenol, and Examples 4–7 illustrating higher melting point epoxide resins.

*Example 2.*—The resin was an aliphatic epoxide resin produced as described in U.S. Patent 2,581,464 by reacting glycerol with epichlorhydrin to form the chlorhydrin ether and dehydrohalogenating this ether to form the polyepoxide. This resin had a weight per epoxide of 155, a molecular weight of about 320, and was a viscous liquid.

*Example 3.*—This resin was a polyepoxide resin having a melting point of 11° C., a weight per epoxide of 200, a molecular weight of about 361, and a weight per hydroxyl group of about 1110; was produced by the reaction of bisphenol with an excess of epichlorhydrin sufficient to act as a solvent and also to react with the bisphenol in the presence of about 2.04 mols of sodium hydroxide; and was made up largely of the diglycide ether of bisphenol.

*Example 4.*—This resin was made by the reaction of 1.57 mols of epichlorhydrin with 1 mol of bisphenol in the presence of 1.88 mols of caustic soda, and had a melting point of 70° C., a weight per epoxide of 475, a molecular weight of about 900, and a weight per hydroxyl group of 286.

*Example 5.*—This resin was made by the reaction of 1.4 mols of epichlorhydrin with 1 mol of bisphenol in the presence of 1.68 mols of sodium hydroxide and had a melting point of 80° C., a weight per epoxide of 570, a molecular weight of about 790, and a weight per hydroxyl of 233.

*Example 6.*—This resin was made by the reaction of 1.22 mols of epichlorhydrin with 1 mol of bisphenol in the presence of 1.46 mols of sodium hydroxide, and had a melting point of 98° C., a weight per epoxide of 900, a molecular weight of about 1400, and a weight per hydroxyl of 228.

*Example 7.*—This resin was made by further reacting the epoxide resin of Example 6 with about 5% of bisphenol to form a higher melting point resin having a melting point of 128° C., a weight per epoxide of 1800, a molecular weight of about 2900 and a weight per hydroxyl of 271.

*Example 8.*—This polyepoxide was an epoxidized soya oil such as described in U.S. Patent 2,485,160 and a product sold under the trade name Paraplex G–62 (Rohm & Haas) and contained about 3.6 epoxy groups per mol, a weight per epoxide of 257, and a molecular weight of about 935.

The following examples, 9 to 13, illustrate the reaction of the adducts with the epoxide resins or polyepoxides, using equivalent proportions of carboxyl and epoxide groups. The carboxyl equivalent referred to in these examples is based on the titrated values as obtained according to the method above described.

*Example 9.*—To a solution of 16.8 parts (0.1 carboxyl equivalent) of the adduct of Example 1 in 16.8 parts of xylene was added 15.5 parts (0.1 epoxide equivalent) of the resin of Example 2.

A 3 mil film of the above blend was drawn on glass and baked at 200° C. for 30 minutes to give a hard, tough, flexible film.

4% (based on solids) triethanol amine was added to the above blend and a second 3 mil film drawn on glass and baked for 1 hour at 150° C. The film had excellent adhesion to glass and improved hardness, toughness, and flexibility over the uncatalyzed film.

*Example 10.*—To 33.6 parts (0.1 carboxyl equivalent) of a 50% solution of the adduct of Example 1 in xylene was added 20 parts (0.1 epoxide equivalent) of the resin of Example 3 and 4% (based on solids) of triethanol amine.

A 3 mil film of the above blend was drawn on glass and baked 1 hour at 150° C. The film was hard and had good resistance to water, alkali and solvents.

*Example 11.*—To a solution of 57 parts (0.1 epoxide equivalent) of the resin of Example 5 was added 16.8 parts (0.1 carboxyl equivalent) of the adduct of Example 1 and 2.95 parts (4% based on the solids) triethanol amine.

A 3 mil film of this blend was drawn on glass and baked 1 hour at 150° C. to give a hard, tough film having good flexibility and adhesion.

A second blend was prepared using 1% (based on solids) DMP-10 in place of the triethanol amine. The film obtained had good water, alkali and solvent resistance.

*Example 12.*—To a solution of 180 parts (0.1 epoxide equivalent) of the resin of Example 10 in 135 parts xylene and 135 parts Cellosolve acetate were added a solution of 16.8 parts (0.1 carboxyl equivalent) of the adduct of Example 1 in 16.8 parts of xylene and 7.87 parts (4% based on solids) triethanol amine.

A 3 mil film of this solution drawn on glass and baked 1 hour at 150° C. gave a hard, tough film that had good water, alkali and solvent resistance.

*Example 13.*—To a mixture of 12.9 parts (0.05 epoxide equivalent) of the epoxidized soya oil of Example 8 (Paraplex G–62) and 16.8 parts (0.05 carboxyl equivalent) of a 50% solution of the adduct of Example 1 in xylene was added 0.21 parts (1% based on solids) of dimethylaminomethyl phenol (DMP-10). The mixture was warmed with stirring to form a clear solution.

A 3 mil film of this solution was drawn on glass and baked at 200° C. for 20 minutes to give a tack-free, flexible film.

The following examples illustrate proportions of epoxide resin or polyepoxide and adducts other than equivalent proportions:

*Example 14.*—To a solution of 57 parts (0.1 epoxide equivalent) of the resin of Example 5 in 28.5 parts xylene and 28.5 parts of Cellosolve acetate was added a solution of 11.8 parts of the adduct of Example 1 (0.07 carboxyl equivalent) in 11.8 parts xylene and 2.7 parts (4% based on solids) of triethanol amine.

A 3 mil film of this blend was drawn on glass and baked at 150° C. for 1 hour to give a hard, tough film having good flexibility and adhesion.

0.7 parts (1% based on solids) of dimethylaminomethyl phenol (DMP-10) was substituted for the triethanol amine in the above blend. A 3 mil film of this blend was drawn on glass and baked at 150° C. for 1 hour to give a film having good water, alkali and solvent resistance.

*Example 15.*—To a solution of 57 parts (0.1 epoxide equivalent) of the resin of Example 5 in 28.5 parts of xylene and 28.5 parts of Cellosolve acetate was added a solution of 22.4 parts (0.133 carboxyl equivalent) of the adduct of Example 1 in 22.4 parts xylene and 3.2 parts (4% based on solids) of triethanol amine.

A 3 mil film of this blend was drawn on glass and baked at 150° C. for 1 hour to give a hard, tough film having good flexibility and adhesion, and good water, alkali and solvent resistance.

1% (based on solids) of dimethylaminomethyl phenol (DMP-10) was substituted for the triethanol amine in the above blend. A 3 mil film of this blend was drawn on glass and baked at 150° C. for 1 hour to give a film having good water, alkali and solvent resistance.

*Example 16.*—The rosin maleic adduct of Example 1 was used with the epoxide resin of Example 2 in different proportions corresponding respectively to 0.72, 1.08 and 1.63 epoxide equivalents of the resin to 1 carboxyl equivalent of the adduct, together with 1%, based on the total solids, of dimethylaminomethyl phenol (DMP-10). 3 mil films were drawn on glass and baked at 150° C. for 30 minutes. The first of these films had fair flexibility and acetone resistance, and gave a mar resistant film. The second of these films had good flexibility, hardness, mar resistance and acetone resistance. The third of these films had good flexibility and fair hardness, mar resistance and acetone resistance.

*Example 17.*—The adduct of Example 1 was used with the resin of Example 3 (80% in xylene) in different proportions corresponding respectively to 0.69, 1.03 and 1.56 epoxide equivalents of the resin to 1 carboxyl equivalent of the adduct, and 1% of dimethylaminomethyl phenol (DMP-10) was added. 3 mil films were drawn on glass and baked at 150° C. for 30 minutes. The first of these films had good hardness and mar resistance and fair acetone resistance. The second of these films had good hardness, mar resistance and acetone resistance. The third of these films had good hardness and fair mar resistance and acetone resistance.

*Example 18.*—The adduct of Example 1 was used with the resin of Example 6 (50% solution in 50/50 xylene Cellosolve acetate) in the proportions respectively of 0.35, 0.56, 1.06 and 3.55 epoxide equivalents of the resin to 1 carboxyl equivalent of the adduct, and 1%, based on the total solids, of dimethylaminoethyl phenol (DMP-10) was added. 3 mil films of the blends were drawn on glass and baked at 150° C. for 30 minutes. The first of these films had good hardness and fair flexibility, mar resistance and acetone resistance. The second of these films had good flexibility, hardness and acetone resistance and fair mar resistance. The third of these films had good flexibility, hardness and mar resistance and fair acetone resistance. The fourth of these films had good hardness and fair flexibility and acetone resistance.

*Example 19.*—The adduct of Example 1 was used with the epoxide resin of Example 7, 40% solution in 50/50 xylene Cellosolve acetate in the proportions respectively of 0.14, 0.22, 0.37, 0.84 and 1.78 epoxide equivalents of the resin to 1 carboxyl equivalent of the adduct, and 1% of dimethylaminomethyl phenol (DMP-10) was added. 3 mil films of the blends were drawn on glass and baked at 150° C. for 30 minutes. The first film had good hardness, fair flexibility and mar resistance, and poor acetone resistance. The second and third films had good flexibility and hardness and fair mar resistance and acetone resistance. The fourth film had good flexibility, hardness, mar resistance and acetone resistance, and the fifth film had good flexibility and hardness, fair mar resistance and poor acetone resistance.

In most of the examples, the proportions of adduct and epoxide resin or polyepoxide are approximately equivalent. Examples 16–19 illustrate varying proportions, including approximately equivalent proportions and proportions in which an excess of epoxide resin or an excess of adduct is used. Particularly with the resins which contain only or mainly reactive epoxy groups and which are free from or contain only a limited amount of hydroxyl groups, proportions approximating equivalent proportions give the best results, as illustrated in Example 16, in which the resin was an aliphatic polyepoxide, and Example 17, where the resin was a liquid resin made up mainly of the diglycide ether of bisphenol.

With higher melting point resins such as used in Examples 18 and 19, where the resins contain a number of hydroxyl groups as well as epoxide groups, smaller ratios of epoxide equivalent to carboxyl equivalent are advantageous.

We claim:

1. The method of converting an epoxide compound having a plurality of epoxide groups selected from the group consisting of (1) glycidyl ethers of polyhydric phenols, (2) glycidyl ethers of polyhydric alcohols, and (3) epoxidized esters of an unsubstituted polyhydric alcohol which is free of non-benzenoid unsaturation and at least one of the acids from the group consisting of oleic and linoleic acids into cross-linked infusible, insoluble reaction products which comprises heating said epoxide compound with a maleic-anhydride-rosin acid adduct having an acid anhydride group and a free carboxyl group in proportions of from about 0.2 to about 2.0 epoxide equivalents of the epoxide compound to one carboxyl equivalent of the adduct, said adduct being produced by the reaction of maleic anhydride with rosin acid, and said heating being carried out at a sufficient temperature for a sufficient length of time to convert the reaction mixture into an infusible, insoluble reaction product.

2. The method of claim 1 in which the proportions are from about 0.5 to about 1.5 epoxide equivalents of the epoxide compound to each carboxyl equivalent of the adduct.

3. The method of claim 1 in which the proportions of the epoxide and carboxyl groups are approximately equivalent.

4. Cross-linked infusible, insoluble reaction products resulting from the process of claim 1.

References Cited in the file of this patent

UNITED STATES PATENTS

| | | |
|---|---|---|
| 2,504,518 | Greenlee | Apr. 18, 1950 |
| 2,572,086 | Wittkoff et al. | Oct. 23, 1951 |
| 2,803,609 | Schlenker | Aug. 20, 1957 |
| 2,848,433 | Eirich | Aug. 19, 1958 |